US011162786B2

(12) United States Patent
Mieno

(10) Patent No.: US 11,162,786 B2
(45) Date of Patent: Nov. 2, 2021

(54) THREE-DIMENSIONAL SURFACE ROUGHNESS EVALUATING DEVICE, THREE-DIMENSIONAL SURFACE ROUGHNESS EVALUATING METHOD, THREE-DIMENSIONAL SURFACE ROUGHNESS DATA ACQUIRING DEVICE, AND THREE-DIMENSIONAL SURFACE ROUGHNESS DATA ACQUIRING METHOD

(71) Applicant: CHUGOKU MARINE PAINTS, LTD., Otake (JP)

(72) Inventor: Hirohisa Mieno, Otake (JP)

(73) Assignee: CHUGOKU MARINE PAINTS, LTD., Otake (JP)

( * ) Notice: Subject to any disclaimer, the term of this patent is extended or adjusted under 35 U.S.C. 154(b) by 237 days.

(21) Appl. No.: 16/320,833

(22) PCT Filed: Jul. 24, 2017

(86) PCT No.: PCT/JP2017/026605
§ 371 (c)(1),
(2) Date: Jan. 25, 2019

(87) PCT Pub. No.: WO2018/021210
PCT Pub. Date: Feb. 1, 2018

(65) Prior Publication Data
US 2019/0162530 A1    May 30, 2019

(30) Foreign Application Priority Data

Jul. 27, 2016  (JP) .............................. JP2016-147605

(51) Int. Cl.
*G01B 11/30*  (2006.01)
*G01N 21/95*  (2006.01)

(52) U.S. Cl.
CPC ............ *G01B 11/306* (2013.01); *G01B 11/30* (2013.01); *G01N 21/95* (2013.01)

(58) Field of Classification Search
CPC ..... G01B 11/30; G01B 11/306; G01B 11/002; G01B 11/022; G01B 11/303; G01D 1/02; G01D 5/3473; G01J 1/02; G01N 21/95
See application file for complete search history.

(56) References Cited

U.S. PATENT DOCUMENTS

| 6,556,945 B1 | 4/2003 | Burggraf et al. |
| 2014/0086453 A1 | 3/2014 | Imada et al. |

FOREIGN PATENT DOCUMENTS

| CN | 102180187 A | 9/2011 |
| CN | 102216728 A | 10/2011 |

(Continued)

OTHER PUBLICATIONS

Korean Notice of Allowance dated Jan. 10, 2020, in Patent Application No. 10-2019-7004507, 2 pages.

(Continued)

*Primary Examiner* — Kara E. Geisel
*Assistant Examiner* — Amanda Merlino
(74) *Attorney, Agent, or Firm* — Oblon, McClelland, Maier & Neustadt, L.L.P.

(57) ABSTRACT

A three-dimensional surface roughness evaluating device wherein a two-dimensional laser displacement meter is disposed so that the width direction of the two-dimensional laser displacement meter coincides with a Y-axis direction, to be able to measure displacement data of coordinates in the Y-axis direction at fixed intervals, the measuring width of the two-dimensional laser displacement meter is at least two or more times mean width of the roughness profile elements RSm of elements of a measurement target, and a calculating device is configured to generate reference surface data of (Continued)

each coordinate by averaging in the Y-axis direction the displacement data acquired at fixed intervals in the X-axis direction by the two-dimensional laser displacement meter, and generate three-dimensional surface roughness data of the measurement target by subtracting the reference surface data of each coordinate from the displacement data of each X-Y plane coordinate.

3 Claims, 13 Drawing Sheets

(56) References Cited

FOREIGN PATENT DOCUMENTS

| | | |
|---|---|---|
| CN | 202153131 U | 2/2012 |
| CN | 202229737 U | 5/2012 |
| CN | 202320395 U | 7/2012 |
| CN | 202885785 U | 4/2013 |
| CN | 103424084 A | 12/2013 |
| CN | 103534583 A | 1/2014 |
| CN | 102706880 B | 4/2014 |
| CN | 105241392 A | 1/2016 |
| CN | 105783779 A | 7/2016 |
| DE | 198 56 510 A1 | 9/1999 |
| JP | 57-80510 A | 5/1982 |
| JP | 61-292509 A | 12/1986 |
| JP | 62-231110 A | 10/1987 |
| JP | 63-177008 A | 7/1988 |
| JP | 6-11331 A | 1/1994 |
| JP | 11-192656 A | 7/1999 |
| JP | 2002-326220 A | 11/2002 |
| JP | 2009-137563 A | 6/2009 |
| JP | 2011-163852 A | 8/2011 |
| JP | 2012-114742 A | 6/2012 |
| JP | 2012-242186 A | 12/2012 |
| JP | 2014-222156 A | 11/2014 |
| JP | 2015-93543 A | 5/2015 |
| JP | 2015-227834 A | 12/2015 |
| KR | 10-2006-0058168 A | 5/2006 |
| KR | 10-2016-0031819 A | 3/2016 |

OTHER PUBLICATIONS

International Search Report dated Oct. 17, 2017, in PCT/JP2017/026605, filed Jul. 24, 2017.
Mieno, H. et al., "Friction Increase due to Roughness of Ship Hull Paint", Journal of the Japan Institute of Marine Engineering, vol. 48, No. 3, 2013, pp. 300-307, with English abstract.
Japanese Office Action dated Feb. 12, 2020, in Patent Application No. 2018-529864, 3 pages.
Keyence, "Ultra-High Speed in-line Profilometer", LJ-V7000 Series, User's Manual, Jun. 2013, 47 pages (with English translation published for Mar. 2019 edition).
Japanese Office Action dated Dec. 15, 2020 in Japanese Patent Application No. 2018-529864, 3 pages.
Gunji, M., et al., "Estimation of roughness statistics of irregular rough surface from linear measurements and prediction of frictional resistance", The Japan Society of Mechanical Engineers, 2015, 9 pages (with English Abstract).
Extended European Search Report dated Mar. 3, 2020 in Patent Application No. 17834216.8, 8 pages.
Office Action dated Jul. 18, 2019 in corresponding Korean Patent Application No. 10-2019-7004507, 6 pages.
Combined Chinese Office Action and Search Report dated Jun. 10, 2020 in Chinese Patent Application No. 201780045996.X (with English translation and English translation of Category of Cited Documents), 11 pages.
Combined Chinese Office Action and Search Report dated Apr. 1, 2021 in Chinese Patent Application No. 201780045996.X, 9 pages.
Zhaolong, et al., "Limit Fit and Measurement Technology", Beijing University of Technology Press, Nov. 2012, pp. 114-119.

[Fig. 1]
(a)
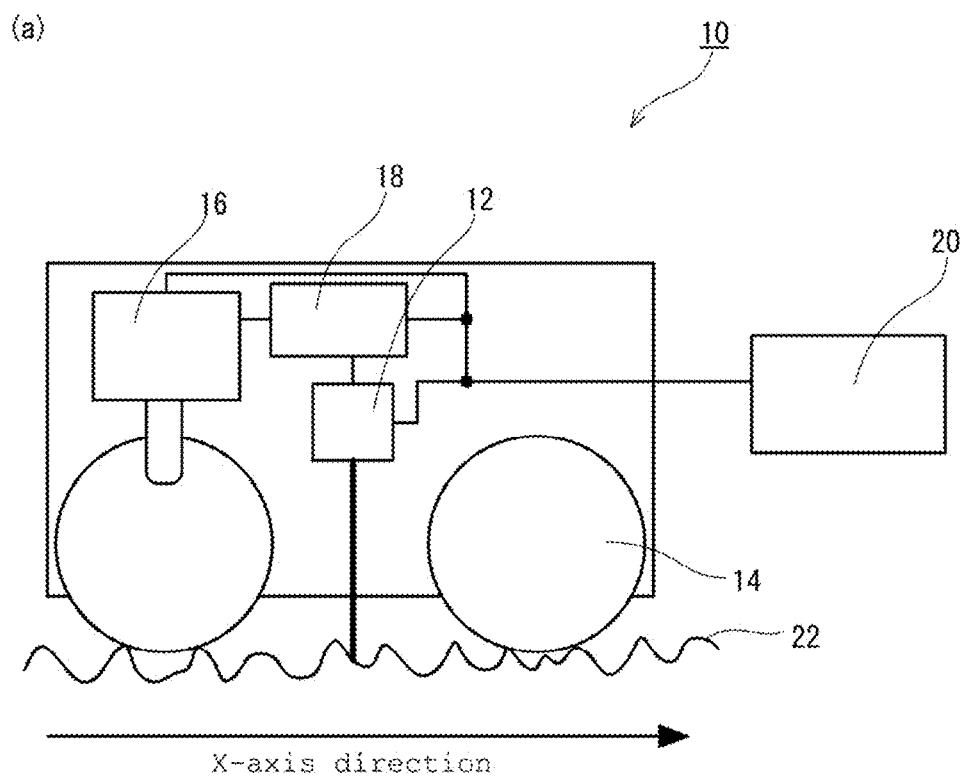
(b)
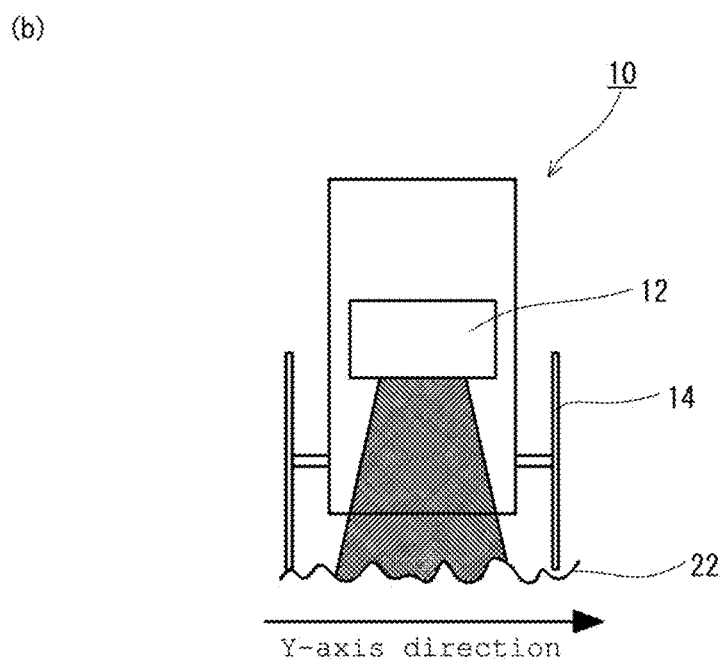

[Fig. 2]
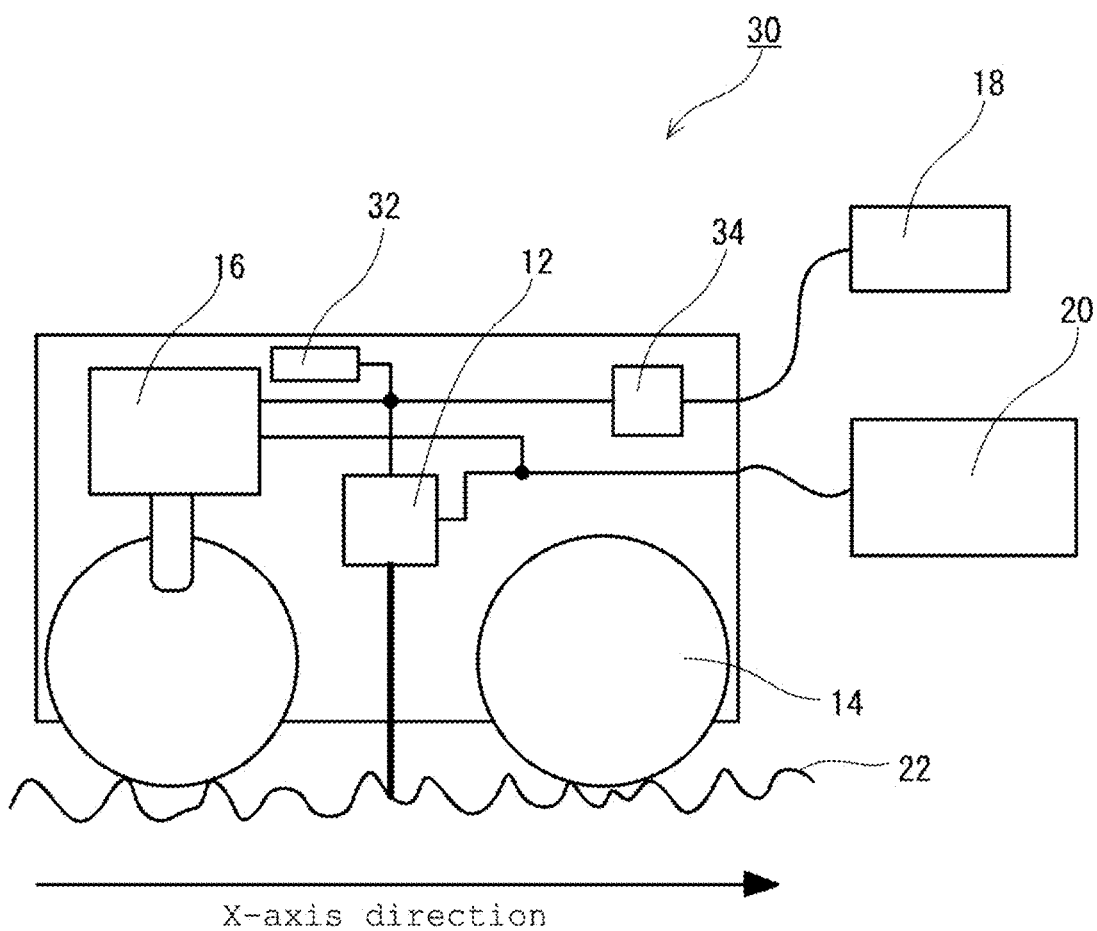

[Fig. 3]
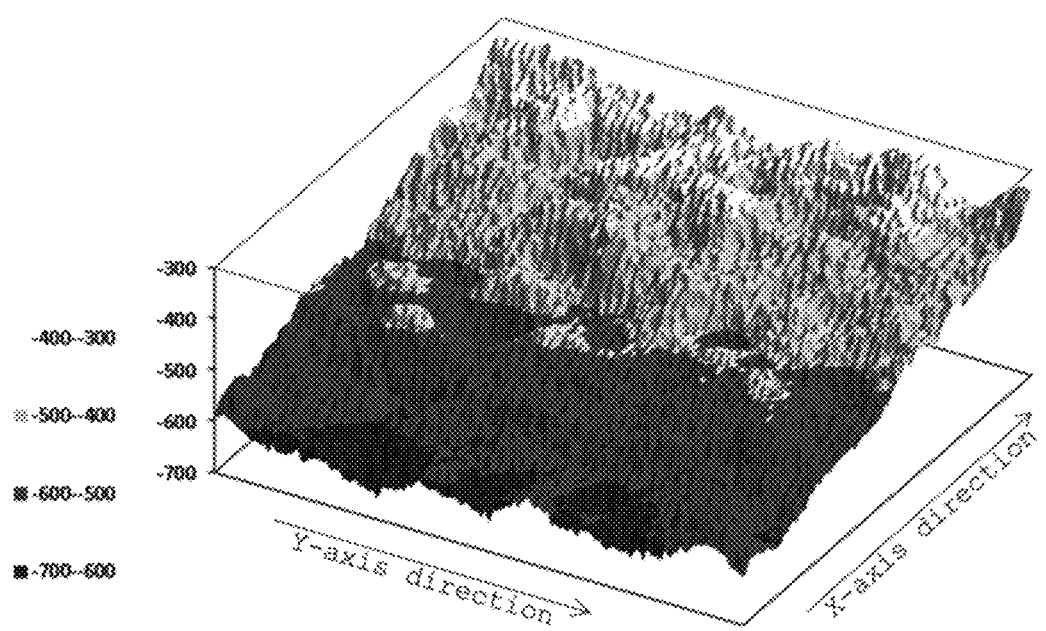

[Fig. 4]
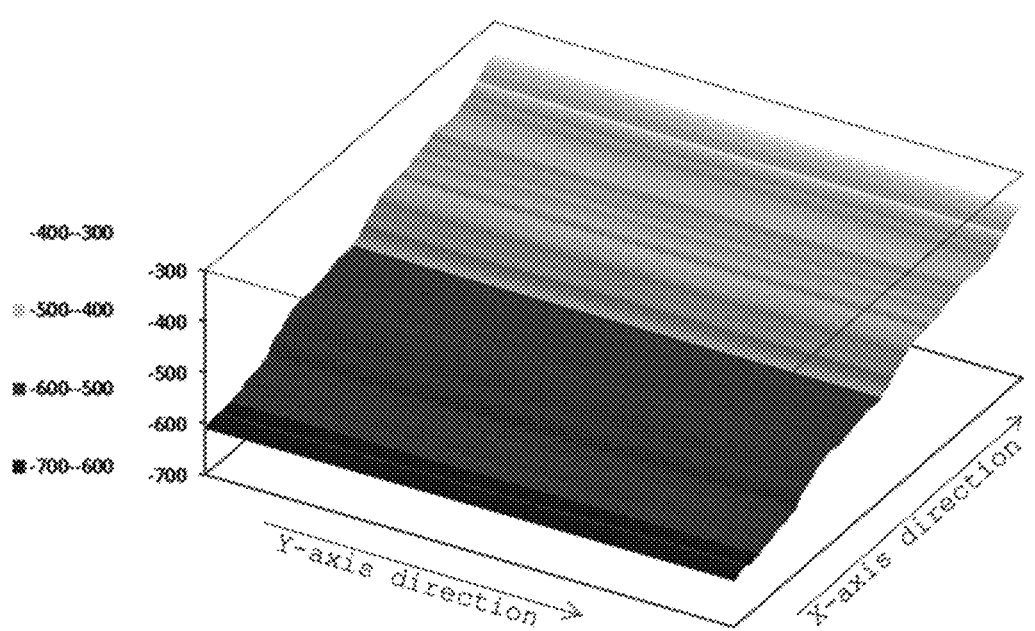

[Fig. 5]
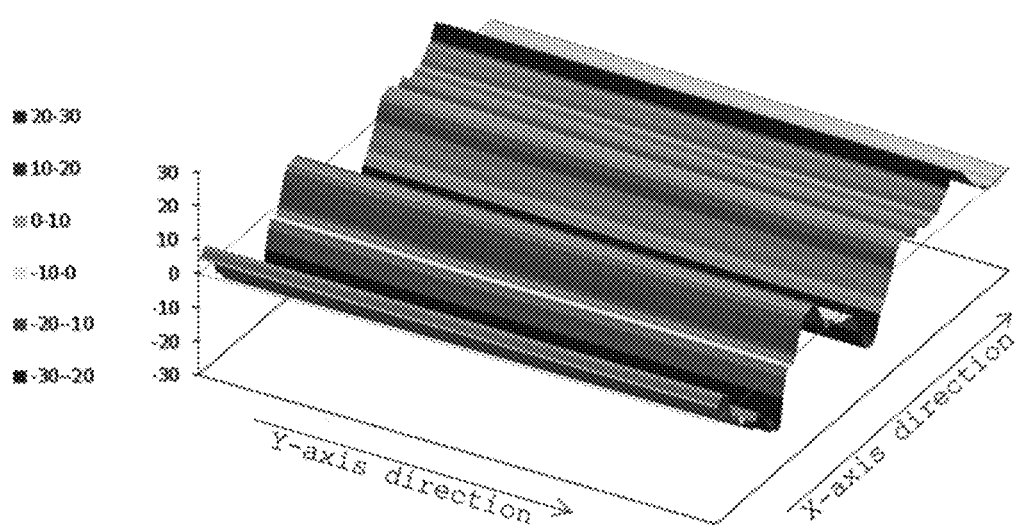

[Fig. 6]
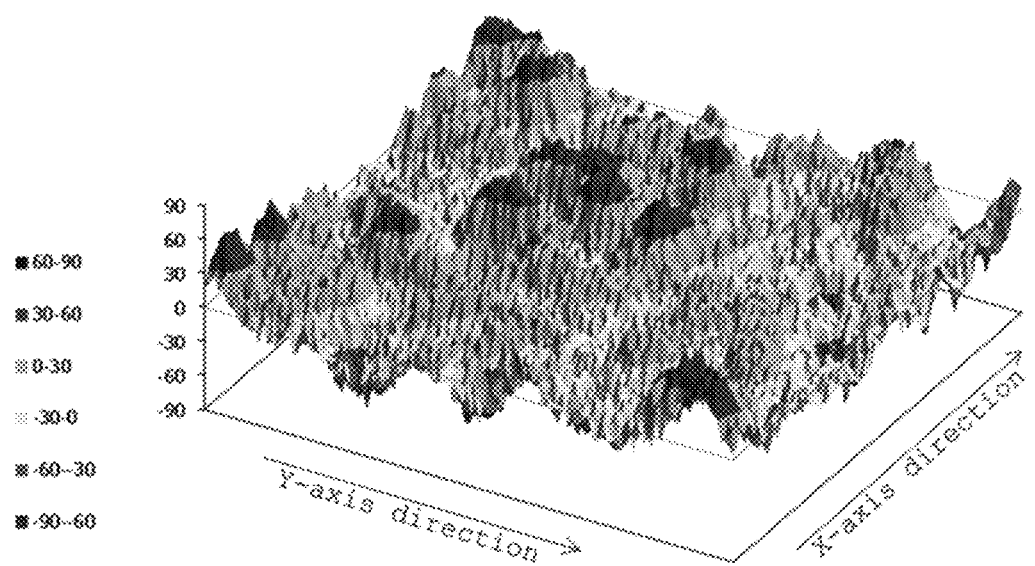

[Fig. 7]
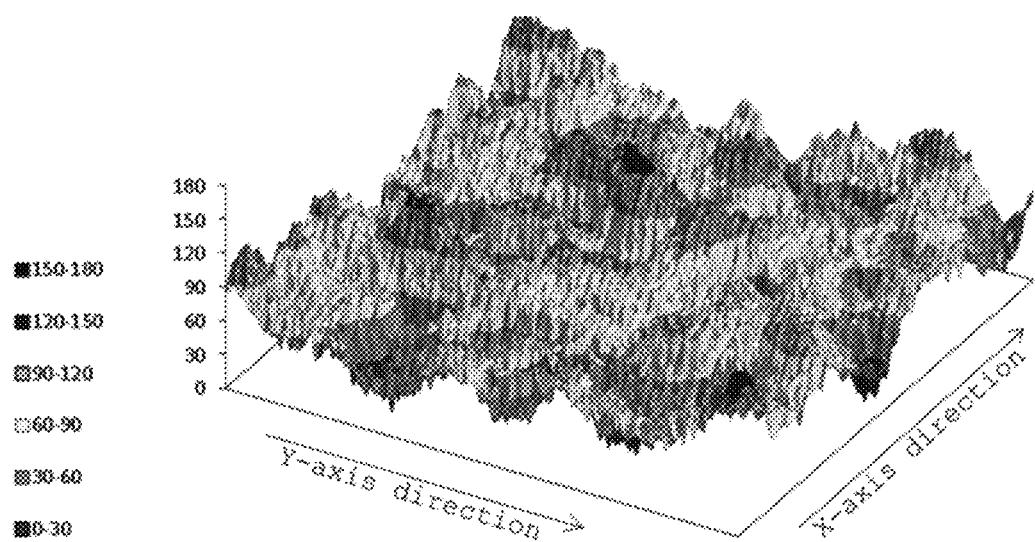
[Fig. 8]
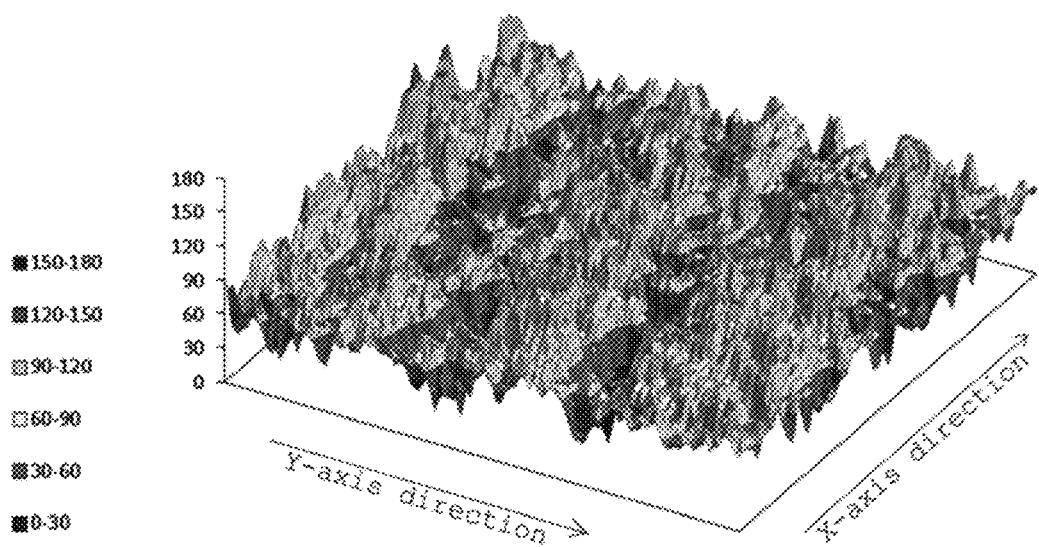

[Fig. 9]
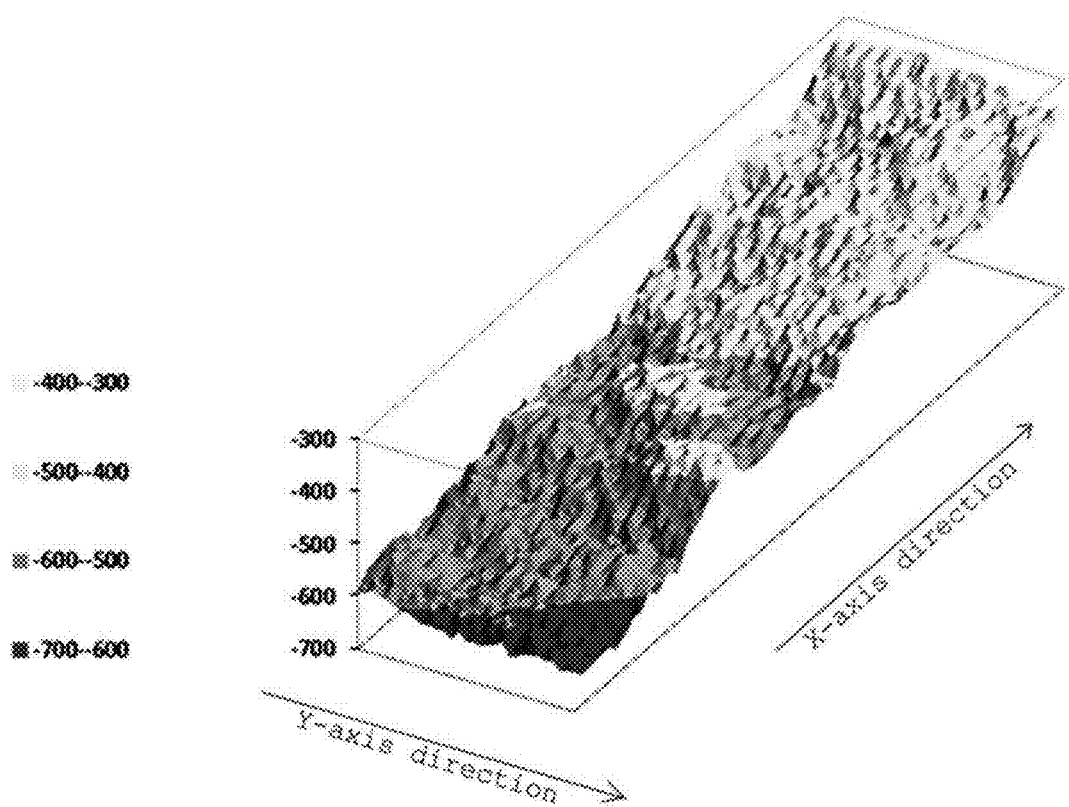

[Fig. 10]
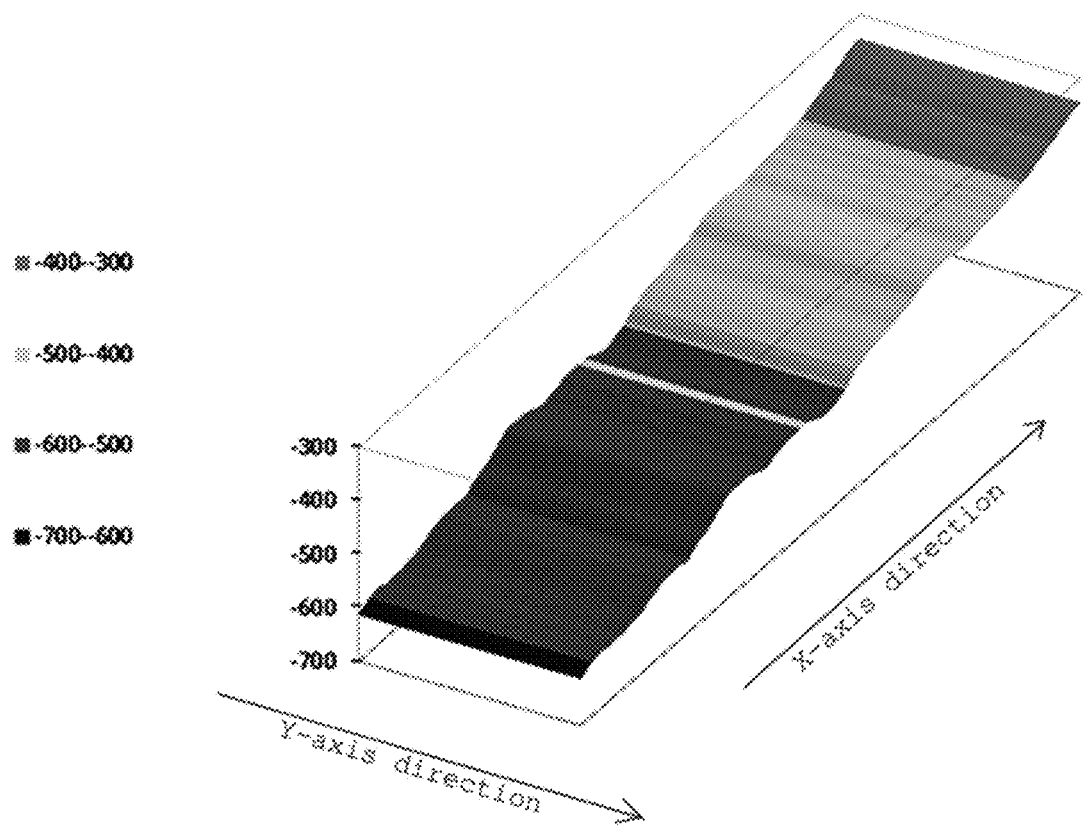

[Fig. 11]
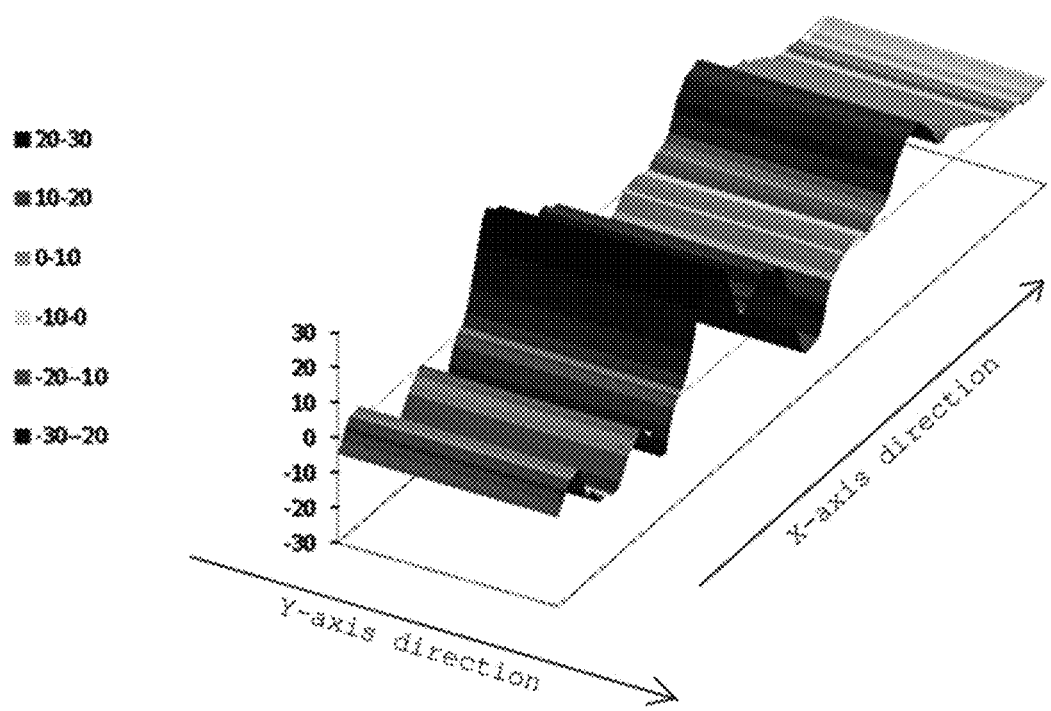

[Fig. 12]
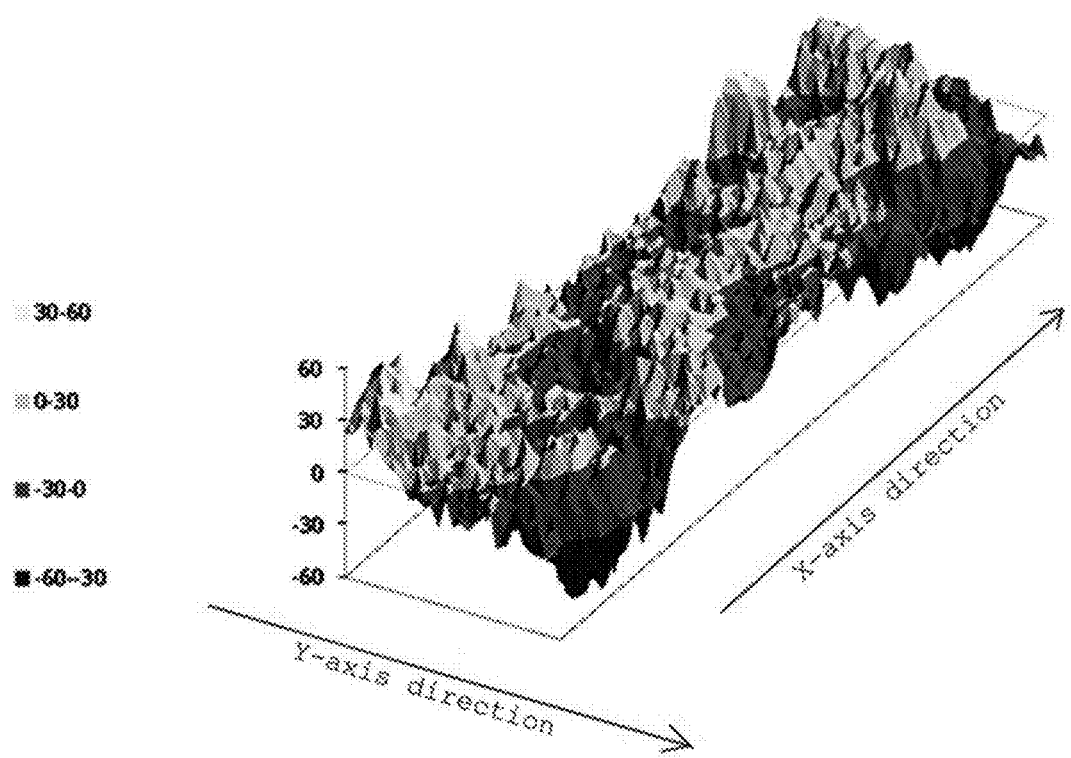

[Fig. 13]
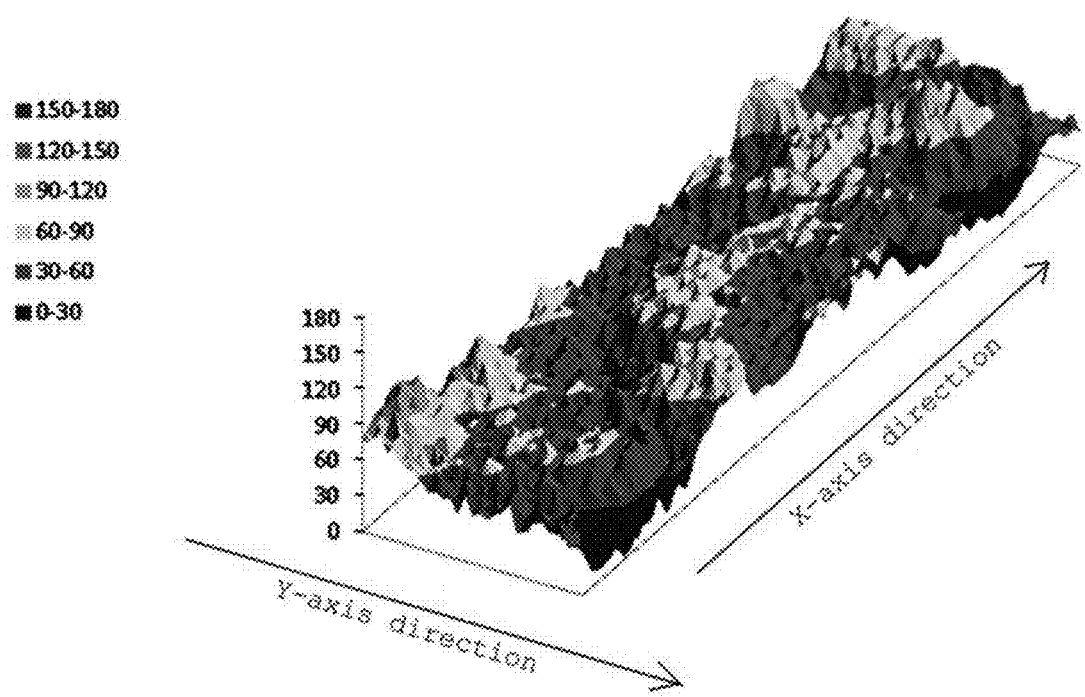
[Fig. 14]
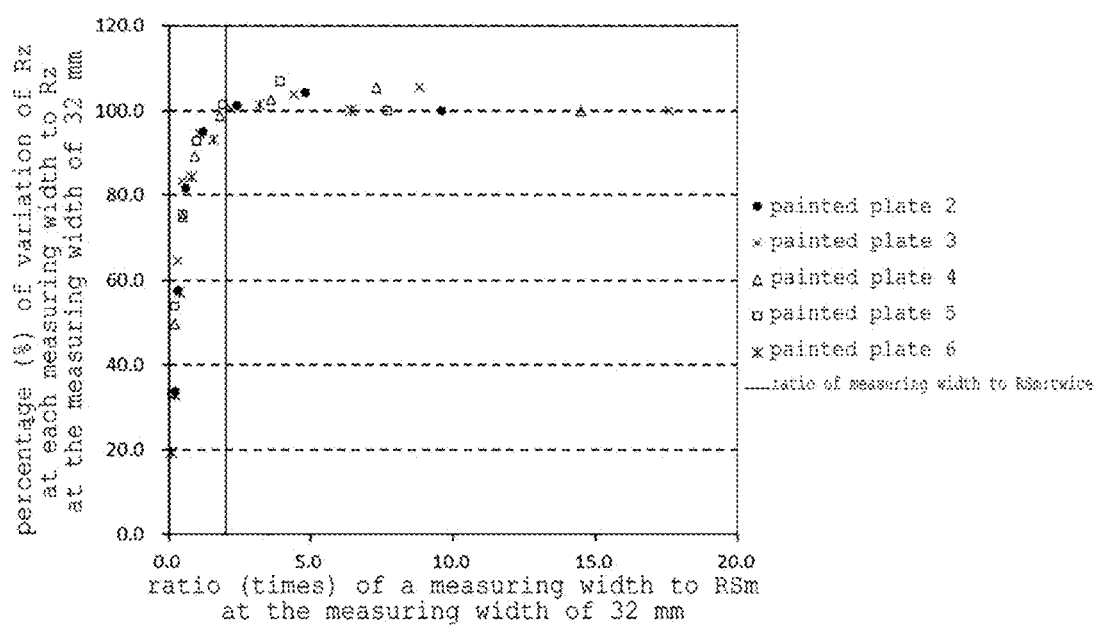

[Fig. 15]
(a)
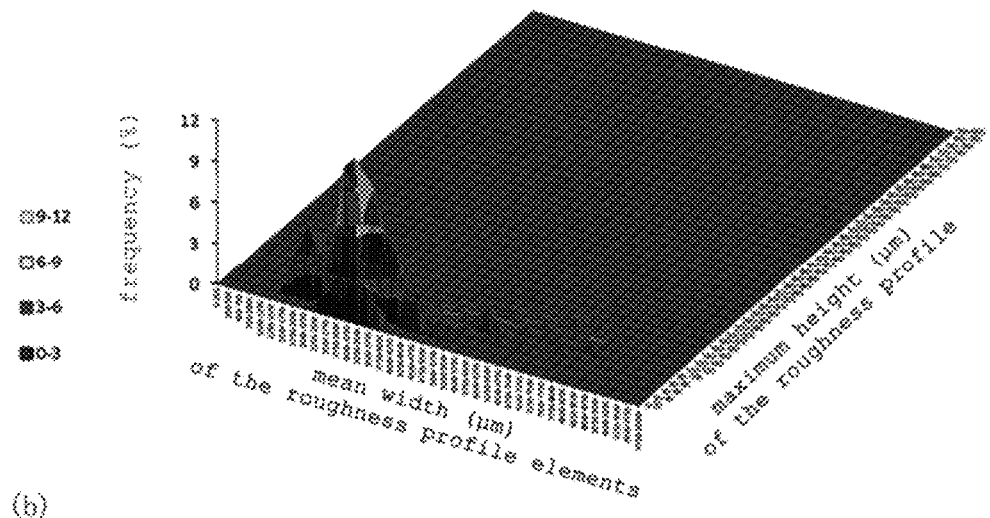
(b)
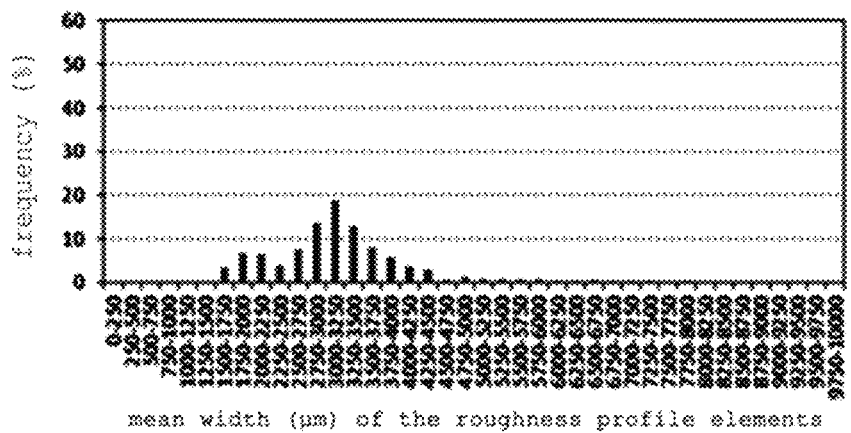
(c)
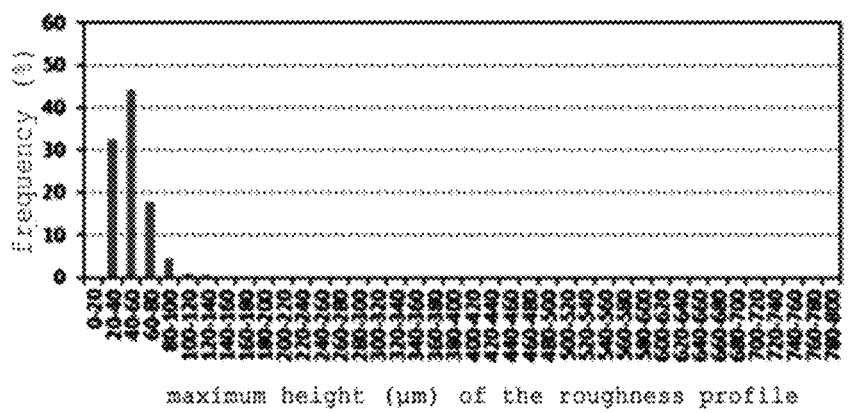

THREE-DIMENSIONAL SURFACE ROUGHNESS EVALUATING DEVICE, THREE-DIMENSIONAL SURFACE ROUGHNESS EVALUATING METHOD, THREE-DIMENSIONAL SURFACE ROUGHNESS DATA ACQUIRING DEVICE, AND THREE-DIMENSIONAL SURFACE ROUGHNESS DATA ACQUIRING METHOD

TECHNICAL FIELD

The present invention relates to a three-dimensional surface roughness evaluating device which acquires surface roughness parameters regarding three-dimensional surface roughness of an untransportable object, structure, or the like. Particularly, the present invention relates to a three-dimensional surface roughness evaluating device, a three-dimensional surface roughness evaluating method, a three-dimensional surface roughness data acquiring device, and a three-dimensional surface roughness data acquiring method which enable surface roughness parameters to be acquired quickly, successively, in large quantities, and directly.

BACKGROUND ART

The surface roughness shape of an object is important in recognizing frictional properties of the surface thereof. In recent years, as shown in Non-Patent Document 1, there has been shown the importance of the measurement of not only roughness height but also a shape parameter including a wavelength or the like, for the recognition of water-flow frictional properties of an object surface.

Non-Patent Document 1 describes an evaluation regarding surface roughness (coating film surface roughness) of a ship hull, and shows that a sufficient number of shape parameters need to be measured within a considerably wide area in order to evaluate surface roughness of an untransportable object or structure, such as a ship hull.

Furthermore, there is pointed out a problem in which, when a "BSRA hull roughness analyzer" that is a conventional roughness measurement instrument is used, precise measurement and a parameter analysis of ship hull surface roughness are impossible. In order to solve the problem, according to Non-Patent Document 1, surface roughness of a ship hull is measured by creating a roughness replica of the surface of the ship hull by use of thermoplastic resin, and performing a surface analysis of the roughness replica by a point-like laser displacement meter mounted on an X-Y stage in a laboratory.

Patent Document 1 suggests a shaded image recording device used as a non-contact roughness measurement device for an untransportable object, structure, or the like.

PRIOR ART DOCUMENTS

Patent Documents

Patent Document 1: Japanese Unexamined Patent Application Publication No. S61-292509

Non-Patent Documents

Non-Patent Document 1: Hirohisa Mieno, Hiroshi Masuda, "Friction Increase due to Roughness of Ship Hull Paint—Reduction of Hull Resistance by Painting on Outer Plate of Ship Bottom", journal of the Japan Institution of Marine Engineering, Vol. 48, No. 3 (2013), pp. 300-307

SUMMARY OF INVENTION

Technical Problem

The technique disclosed in Non-Patent Document 1 is limited in the area that can be replicated by a roughness replica, and therefore has a problem that excessive labor is required to evaluate a wide area. Moreover, the technique disclosed in Patent Document 1 measures roughness on the basis of a shaded image taken by applying a light source, and is therefore not suited to accurately measuring a shape parameter of a relatively smooth surface.

Furthermore, in the measurement of a roughness parameter of micrometer-order minute roughness, the most accurate measurement can be performed by causing a laser-type optical displacement meter to traverse by an X-Y stage or the like and thus ensuring mechanical precision.

However, when it is necessary to measure a wide area, for example, a ship hull by such a method, a traversing device is increased in size and weight, which makes difficult on-site handling including processing, painting, and others. Moreover, despite a size increase, there is a technical limitation under which the operation range of the traversing device and measurement area are limited.

Still further, when an X-Y stage is used, it is necessary to use a precision stage and a stepping motor in order to precisely actuate the X-Y stage in an X-Y direction. In addition, it is also necessary to provide an X-Y stage controller which controls such an X-Y stage, a controller for a laser displacement meter, and the like. This leads to the increase of weight and power consumption as a measurement device, and is therefore not suited to carrying the measurement device.

In view of such circumstances, the present invention is intended to provide a three-dimensional surface roughness evaluating device, a three-dimensional surface roughness evaluating method, a three-dimensional surface roughness data acquiring device, and a three-dimensional surface roughness data acquiring method which enable surface roughness parameters regarding three-dimensional surface roughness of an untransportable object, structure, or the like to be acquired quickly, successively, in large quantities, and directly.

Solving to Problem

The present invention has been made to solve the above-described problem in the conventional technique, and a three-dimensional surface roughness evaluating device according to the present invention includes:

a two-dimensional laser displacement meter;

a movement mechanism which moves the two-dimensional laser displacement meter in an X-axis direction;

a movement distance measuring device which measures a movement distance of the two-dimensional laser displacement meter in the X-axis direction; and a calculating device which generates three-dimensional surface roughness data of a measurement target on the basis of displacement data acquired by the two-dimensional laser displacement meter and movement distance data acquired by the movement distance measuring device, wherein the two-dimensional laser displacement meter is disposed so that the width direction of the two-dimensional laser displacement meter coincides with a Y-axis direction, to be able to measure displacement data of coordinates in the Y-axis direction at fixed intervals, the measuring width of the two-dimensional laser displacement meter is at least two or more times mean width of the roughness profile elements RSm of elements of the measurement target, and the calculating device is configured to generate reference surface data of each coordinate by averaging in the Y-axis direction the displacement data acquired at fixed intervals in the X-axis direction by the two-dimensional laser displacement meter, and generate three-dimensional surface roughness data of the measurement target by subtracting the reference surface data of each coordinate from the displacement data of each X-Y plane coordinate.

In such a three-dimensional surface roughness evaluating device, the movement distance measuring device can be a device which reads a movement distance with a scale sensor by a circular scale that operates together with the movement mechanism, or a device which reads the number of revolutions by a rotary encoder and computes a movement distance.

In addition, it is also possible to further provide a transportable battery.

Furthermore, a three-dimensional surface roughness evaluating method according to the present invention generates three-dimensional surface roughness data of a measurement target, and includes:

acquiring displacement data by measuring a displacement in an X-axis direction at fixed intervals by a two-dimensional laser displacement meter having a measuring width that is at least two or more times mean width of the roughness profile elements RSm of elements of a measurement target;

averaging the displacement data in the Y-axis direction and thus generating reference surface data of each coordinate; and subtracting the reference surface data of each coordinate from the displacement data of each X-Y plane coordinate, and thus generating three-dimensional surface roughness data of the measurement target.

Still further, a three-dimensional surface roughness data acquiring device according to the present invention includes:

a two-dimensional laser displacement meter;

a movement mechanism which moves the two-dimensional laser displacement meter in an X-axis direction; and a movement distance measuring device which measures a movement distance of the two-dimensional laser displacement meter in the X-axis direction, wherein the two-dimensional laser displacement meter is disposed so that the width direction of the two-dimensional laser displacement meter coincides with a Y-axis direction, to be able to measure displacement data of coordinates in the Y-axis direction at fixed intervals, and the measuring width of the two-dimensional laser displacement meter is at least two or more times mean width of the roughness profile elements RSm of elements of a measurement target.

In such a three-dimensional surface roughness data acquiring device, the movement distance measuring device can be a device which reads a movement distance with a scale sensor by a circular scale that operates together with the movement mechanism, or a device which reads the number of revolutions by a rotary encoder and computes a movement distance.

In addition, it is also possible to further provide a transportable battery.

Further yet, a three-dimensional surface roughness data acquiring method according to the present invention acquires three-dimensional surface roughness data of a measurement target, and includes:

acquiring displacement data by measuring a displacement in an X-axis direction at fixed intervals by a two-dimensional laser displacement meter having a measuring width that is at least two or more times mean width of the roughness profile elements RSm of elements of a measurement target.

Advantageous Effects of Invention

According to the present invention, it is possible to acquire surface roughness parameters from the surface of a measurement target quickly, successively, in large quantities, and directly, even if the measurement target is an untransportable object, structure, or the like.

BRIEF DESCRIPTION OF DRAWINGS

FIG. 1 is a schematic configuration diagram for illustrating the configuration of a three-dimensional surface roughness evaluating device according to the present example.

FIG. 2 is a schematic configuration diagram for illustrating the configuration of a three-dimensional surface roughness data acquiring device.

FIG. 3 shows displacement data of X-Y plane coordinates when a painted plate 1 in a state where the surface of a metal plate is painted with paint (A state where the surface is coated with a dry coating film. The same applies to the following.) is measured as a measurement target.

FIG. 4 shows reference surface data of each coordinate generated by averaging in a Y-axis direction the displacement data of the X-Y plane coordinates in FIG. 3.

FIG. 5 shows reference surface data in which the inclination of the reference surface data shown in FIG. 4 is corrected by a least squares method.

FIG. 6 shows three-dimensional surface roughness data obtained by subtracting the reference surface data shown in FIG. 4 from the displacement data shown in FIG. 3.

FIG. 7 graphically shows analytic results of surface roughness parameters obtained from the three-dimensional surface roughness data in FIG. 6.

FIG. 8 graphically shows analytic results of surface roughness parameters acquired by a laser displacement meter mounted on an X-Y stage, regarding the painted plate 1 as a measurement target.

FIG. 9 is a comparative example of displacement data of X-Y plane coordinates when a range of 7.5 mm from the end of a Y-axis direction is measured, regarding the painted plate 1 as a measurement target.

FIG. 10 shows reference surface data of each coordinate generated by averaging in the Y-axis direction the displacement data of the X-Y plane coordinates in FIG. 9.

FIG. 11 shows reference surface data in which the inclination of the reference surface data shown in FIG. 10 is corrected by the least squares method.

FIG. 12 shows three-dimensional surface roughness data obtained by subtracting the reference surface data shown in FIG. 10 from the displacement data shown in FIG. 9.

FIG. 13 graphically shows analytic results of surface roughness parameters obtained from the three-dimensional surface roughness data in FIG. 12.

FIG. 14 is a graph showing the relation between the ratio of a measuring width to mean width of the roughness profile elements RSm of elements at a measuring width of 32 mm, and the percentage (%) of the maximum height of the roughness profile Rz at each measuring width to the maximum height of the roughness profile Rz at a measuring width of 32 mm, regarding painted plates 2 to 6.

FIG. 15 is a histogram showing the distribution of surface roughness parameters when the three-dimensional surface roughness of a ship hull is measured as a measurement target by use of the three-dimensional surface roughness evaluating device according to the present example.

DESCRIPTION OF EMBODIMENTS

Hereinafter, an embodiment (example) of the present invention will be described in more detail with reference to the drawings.

FIG. 1 is a schematic configuration diagram for illustrating the configuration of a three-dimensional surface roughness evaluating device according to the present example. FIG. 1(a) is a schematic configuration diagram seen from the side surface, and FIG. 1(b) is a schematic configuration diagram seen from the front surface.

As shown in FIG. 1, a three-dimensional surface roughness evaluating device 10 according to the present example includes a two-dimensional laser displacement meter 12, a movement mechanism 14, a movement distance measuring device 16, a calculating device 18, and a transportable battery 20 serving to move the two-dimensional laser displacement meter 12, the movement distance measuring device 16, and the calculating device 18.

It should be noted that, when it is not necessary to check a calculation result at a measurement site, the three-dimensional surface roughness evaluating device 10 can also be used as a three-dimensional surface roughness data acquiring device 30 if configured to store displacement data acquired by the two-dimensional laser displacement meter 12 and movement distance data acquired by the movement distance measuring device 16 in a storage device 32 such as a hard disk drive or a flash memory, or transmit the data to a later-described external terminal by use of a communication means 34, as shown in FIG. 2.

By separating the calculating device 18 in this way and thus using the external terminal as the calculating device 18, the device configuration at the measurement site can be simplified. It is also possible to calculate the acquired data by an external calculating device such as a personal computer, and display calculation results.

It should be noted that, as the two-dimensional laser displacement meter 12, it is possible to use, without particular limitation, for example, LJ-V7080 (having a laser width of 32 mm at a reference distance) manufactured by Keyence Corporation.

Moreover, the two-dimensional laser displacement meter is disposed so that the width direction of the two-dimensional laser displacement meter 12 is perpendicular to the movement direction (X-axis direction) of the movement mechanism 14, i.e., coincides with a Y-axis direction, to be able to measure displacement data of coordinates in the Y-axis direction at a time at fixed intervals.

Further, in the present example, the movement mechanism 14 includes two pairs of wheels (i.e., four wheels) movable only in a predetermined direction (X-axis direction). However, as long as the movement mechanism 14 is a mechanism movable only in a predetermined direction, the movement mechanism 14 is not particularly limited, and may be, for example, a crawler.

Additionally, in the present example, a rotary encoder is used as the movement distance measuring device 16, and, by reading the number of revolutions of the wheel which is the movement mechanism 14, a movement distance is computed on the basis of the peripheral length and the number of revolutions of the wheel.

It should be noted that the movement distance measuring device 16 is not limited to this, and can also be, for example, such a device as to read a movement distance with a scale sensor by a circular scale that operates together with the movement mechanism 14.

Furthermore, the calculating device 18 is not particularly limited as long as the calculating device 18 is capable of computing surface roughness parameters or the like on the basis of the displacement data acquired by the two-dimensional laser displacement meter 12 and the movement distance data acquired by the movement distance measuring device 16, as described later. For example, the calculating device 18 can be configured to transmit the displacement data and the movement distance data to an external terminal such as a tablet computer, a smartphone, or a personal computer, then perform calculating processing, and display a calculation result on the external terminal.

When the calculating device 18 is internally provided in the three-dimensional surface roughness evaluating device 10, a display means which displays calculation results of surface roughness parameters or the like may be provided, and it is also possible to provide a data output means so that the calculation results are transmitted to and displayed on, for example, the above-described external terminal.

Moreover, as the transportable battery 20, it is possible to use, without particular limitation, an existing secondary battery such as a lead storage battery, a nickel-hydrogen secondary battery, or a lithium-ion secondary battery.

It should be noted that, although the three-dimensional surface roughness evaluating device 10 is equipped with the transportable battery 20 and is thus easy to carry in the present example, the three-dimensional surface roughness evaluating device 10 can also be configured so that electric power for the two-dimensional laser displacement meter 12, the calculating device 18, and others is supplied from, for example, an external battery or a commercial power source.

EXAMPLE 1

A specific example of a surface roughness evaluation of a measurement target 22 by the three-dimensional surface roughness evaluating device 10 according to the present example having the above configuration is shown below.

First, the three-dimensional surface roughness evaluating device 10 is moved on the surface of the measurement target 22 by the movement mechanism 14. Thereby, movement distance data based on a movement distance obtained by the movement distance measuring device 16 at fixed intervals, and displacement data obtained by the two-dimensional laser displacement meter 12 are recorded in the calculating device 18.

FIG. 3 shows displacement data of X-Y plane coordinates when a painted plate 1 in a state where the surface of a metal plate is painted with paint is measured as the measurement target 22.

It should be noted that the displacement data shown in FIG. 3 are 121×121 (121 points in both the X-axis and Y-axis directions) pieces of data acquired with a pitch of 250 μm in a measurement area of 30 mm×30 mm of the painted plate 1 by the three-dimensional surface roughness evaluating device 10 according to the present example. In the present example, such measurement was completed within one second.

Then, the calculating device 18 generated reference surface data of each coordinate as shown in FIG. 4 by averaging displacement data of X-Y plane coordinates in the Y-axis direction.

Reference surface data in which the inclination of the reference surface data shown in FIG. 4 is corrected by a least squares method are shown in FIG. 5. It should be noted that the vertical axis is enlarged to ±30 µm in FIG. 5. It can be seen by FIG. 5 that the reference surface data include an eccentricity of approximately ±30 µm of the wheels which are the movement mechanism 14.

Thus, the displacement data shown in FIG. 3 include the inclination of the measurement target 22, and eccentricity resulting from the rolling of the wheels which are the movement mechanism 14, in addition to surface roughness, and are not suited to a surface roughness evaluation. Accordingly, the reference surface data shown in FIG. 4 are subtracted from the displacement data shown in FIG. 3 by the calculating device 18. Thereby, the inclination and the eccentricity resulting from the rolling of the wheels which are the movement mechanism 14 included in the displacement data are removed, and more accurate three-dimensional surface roughness data can be acquired.

Three-dimensional surface roughness data obtained in this way are shown in FIG. 6.

FIG. 7 graphically shows Rz (maximum height of the roughness profile), RSm (mean width of the roughness profile elements), Rzjis (ten-point mean roughness), Ra (arithmetical mean deviation of the roughness profile), Rq (root mean square deviation of the roughness profile), Rc (mean height of the roughness profile elements), Rsk (skewness of the roughness profile), and Rku (kurtosis of the roughness profile) which are surface roughness parameters computed from the three-dimensional surface roughness data shown in FIG. 6, wherein the minimum point of displacement is zero.

Rz of the painted plate 1 was 78.9 µm, RSm was 3466 µm, Rzjis was 45.1 µm, Ra was 14.2 µm, Rq was 17.6 µm, Rc was 29.9 µm, Rsk was 0.08, and Rku was 2.7.

COMPARATIVE EXAMPLE 1

In order to verify the validity of the surface roughness parameters obtained by the three-dimensional surface roughness evaluating device 10 according to the present example, surface roughness parameters in the same range as the measurement area of the painted plate 1 in Example 1 were measured by a laser displacement meter (point-like laser type displacement meter) mounted on an X-Y stage.

When a measurement area of 30 mm×30 mm of the measurement target 22 is measured with a pitch of 250 µm by the laser displacement meter mounted on the X-Y stage as in Example 1, it is necessary to repeat the process of measuring 121 points in the X-axis direction with a pitch of 250 µm, then moving the laser displacement meter 250 µm in the Y-axis direction, and again measuring 121 points in the X-axis direction with a pitch of 250 µm. Thus, in the present comparative example, a time of approximately 5 minutes was required for such measurement.

FIG. 8 graphically shows computations of Rz (maximum height of the roughness profile), RSm (mean width of the roughness profile elements), Rzjis (ten-point mean roughness), Ra (arithmetical mean deviation of the roughness profile), Rq (root mean square deviation of the roughness profile), Rc (mean height of the roughness profile elements), Rsk (skewness of the roughness profile), and Rku (kurtosis of the roughness profile) which are surface roughness parameters acquired by the laser displacement meter mounted on the X-Y stage, regarding the painted plate 1 in Example 1.

Rz of the painted plate 1 measured by the laser displacement meter was 78.1 µm, RSm was 3561 µm, Rzjis was 50.5 µm, Ra was 13.1 µm, Rq was 16.3 µm, Rc was 35.2 µm, Rsk was −0.11, and Rku was 2.8. Results equivalent to the surface roughness parameters obtained by use of the three-dimensional surface roughness evaluating device 10 according to Example 1 were obtained.

COMPARATIVE EXAMPLE 2

In order to simulate a case where a two-dimensional laser displacement meter having a laser width of 7.5 mm was used as the two-dimensional laser displacement meter 12, surface roughness parameters in a range of 7.5 mm from the end of the Y-axis direction were measured, out of the measurement area of the painted plate 1 in Example 1. It should be noted that the configuration similar to that of the three-dimensional surface roughness evaluating device 10 according to Example 1 was used except for the laser width of the two-dimensional laser displacement meter 12.

FIG. 9 shows displacement data of X-Y plane coordinates, in which 121×31 (121 points in the X-axis direction, and 31 points in the Y-axis direction) pieces of data were acquired with a pitch of 250 µm in a measurement area of 30 mm×7.5 mm regarding the painted plate 1.

As in Example 1, displacement data of X-Y plane coordinates were averaged in the Y-axis direction, and reference surface data of each coordinate shown in FIG. 10 were thus generated. FIG. 11 shows the inclination of the reference surface data corrected by the least squares method. As in FIG. 5, eccentricity of the wheels which are the movement mechanism 14 can be identified, but the width of the displacement is greater than that in FIG. 5.

FIG. 12 shows three-dimensional surface roughness data in which the reference surface data shown in FIG. 10 are subtracted from the displacement data shown in FIG. 9, and the inclination and the eccentricity resulting from the rolling of the wheels which are the movement mechanism 14 included in the displacement data are removed.

FIG. 13 graphically shows Rz (maximum height of the roughness profile), RSm (mean width of the roughness profile elements), Rzjis (ten-point mean roughness), Ra (arithmetical mean deviation of the roughness profile), Rq (root mean square deviation of the roughness profile), Rc (mean height of the roughness profile elements), Rsk (skewness of the roughness profile), and Rku (kurtosis of the roughness profile) which are surface roughness parameters computed from the three-dimensional surface roughness data shown in FIG. 12, wherein the minimum point of displacement is zero.

Rz of the painted plate 1 measured in Comparative Example 2 was 56.3 µm, RSm was 3900 µm, Rzjis was 34.9 µm, Ra was 10 µm, Rq was 12.4 µm, Rc was 24.9 µm, Rsk was 0.09, and Rku was 2.8.

In Comparative Example 2, the surface roughness parameters regarding roughness height including Rz, Rzjis, Ra, Rq, and Rc are smaller than in Example 1 and Comparative Example 1. This is attributed to the fact that a surface roughness shape is included in the reference surface data averaged in the width direction (Y-axis direction) of two-dimensional laser.

Another reason is considered to be that roughness height is undervalued if the measuring width (in Comparative Example 2, 7.5 mm which is a laser width) of the two-dimensional laser displacement meter 12 which is the length in the Y-axis direction to be averaged is excessively small as compared with RSm (mean width of the roughness profile elements) of the measurement target 22 (3900 µm=3.9 mm in Comparative Example 2).

In order to appropriately evaluate roughness height, the length (the measuring width of the two-dimensional laser displacement meter 12) in the Y-axis direction to be averaged is preferably two or more times RSm of the measurement target 22. The relation between the measuring width of the two-dimensional laser displacement meter 12 and the mean width of the roughness profile elements RSm of the elements of the measurement target 22 is examined below.

EXAMPLE 2

Table 1 shows each surface roughness parameter obtained by measuring a painted plate 2 in a state where the surface of a metal plate is painted with paint as the measurement target 22, changing the measuring width of the two-dimensional laser displacement meter 12 to 0.5 mm, 1 mm, 2 mm, 4 mm, 16 mm, and 32 mm, and thus correcting by reference surface data averaged in the width direction (Y-axis direction) of two-dimensional laser at each measuring width.

TABLE 1

| Measuring width (mm) | Rz (µm) | RSm (µm) | Rzjis (µm) | Ra (µm) | Rq (µm) | Rc (µm) | Rsk | Rku |
|---|---|---|---|---|---|---|---|---|
| 0.5 | 37.7 | 3140 | 26.4 | 6.2 | 7.7 | 17.9 | 0.0 | 2.9 |
| 1 | 64.5 | 3336 | 44.3 | 10.7 | 13.4 | 30.8 | −0.1 | 3.0 |
| 2 | 91.3 | 3477 | 62.5 | 15.3 | 19.1 | 44.6 | 0.0 | 2.8 |
| 4 | 106.4 | 3545 | 73.0 | 18.0 | 22.5 | 52.0 | 0.1 | 2.9 |
| 8 | 113.1 | 3504 | 78.0 | 19.3 | 24.0 | 55.2 | 0.1 | 2.9 |
| 16 | 116.7 | 3554 | 80.5 | 19.9 | 24.8 | 57.7 | 0.2 | 2.9 |
| 32 | 111.8 | 3325 | 77.9 | 19.2 | 23.8 | 55.1 | 0.1 | 2.7 |

As shown in Table 1, Rz, Rzjis, Ra, Rq, and Rc which are surface parameters regarding roughness height become smaller as the measuring width becomes smaller. This is attributed to the fact that the amount of a surface roughness shape included in the reference surface data averaged in the width direction (Y-axis direction) of the two-dimensional laser displacement meter 12 increases as the measuring width becomes smaller.

Moreover, it has become apparent that all of Rz, Rzjis, Ra, Rq, and Rc, which are surface parameters regarding roughness height, tend to converge into true values as the measuring width becomes greater. This is attributed to the fact that a surface roughness shape is no longer included in the reference surface data averaged in the width direction (Y-axis direction) of two-dimensional laser if the measuring width becomes much greater than RSm.

It should be noted that the maximum height of the roughness profile Rz at a measuring width of 32 mm is 111.8 µm, and the mean width of the roughness profile elements RSm of elements is 3325 µm.

Table 2 shows the ratio of each measuring width in Table 1 to RSm (3325 µm) at a measuring width of 32 mm, and the percentage of each surface roughness parameter at each measuring width in Table 1 to each surface roughness parameter at a measuring width of 32 mm.

TABLE 2

| Ratio of measuring width to RSm at measuring width of 32 mm | Percentage (%) of each surface roughness parameter at each measuring width to each surface roughness parameter value at measuring width of 32 mm | | | | | |
|---|---|---|---|---|---|---|
| | Rz (%) | RSm (%) | Rzjis (%) | Ra (%) | Rq (%) | Rc (%) |
| 0.2 | 33.7 | 94.4 | 33.9 | 32.2 | 32.3 | 32.5 |
| 0.3 | 57.7 | 100.3 | 56.8 | 55.7 | 56.1 | 55.9 |
| 0.6 | 81.7 | 104.6 | 80.2 | 79.7 | 80.1 | 80.9 |
| 1.2 | 95.2 | 106.6 | 93.7 | 94.0 | 94.3 | 94.4 |
| 2.4 | 101.2 | 105.4 | 100.1 | 100.5 | 100.8 | 100.2 |
| 4.8 | 104.4 | 106.9 | 103.3 | 103.7 | 103.9 | 104.7 |
| 9.6 | 100.0 | 100.0 | 100.0 | 100.0 | 100.0 | 100.0 |

The percentage of Rz at each measuring width to Rz at a measuring width of 32 mm is 33.7% when the ratio of the measuring width to RSm at a measuring width of 32 mm is 0.2, 57.7% when 0.3, 81.7% when 0.6, 95.2% when 1.2, 101.2% when 2.4, and 104.4% when 4.8. It is apparent that the percentage tends to converge into 100% as the ratio of the measuring width to RSm becomes greater. Particularly, the percentage converges into substantially 100% when the measuring width is approximately twice RSm.

When an object having an unknown surface roughness shape is measured as the measurement target 22, it is also possible to vary the measuring width of the two-dimensional laser displacement meter 12 as above, and thus select, as a valid measuring width, a range of measuring widths in which the variation of each surface roughness parameter is small.

Table 3, Table 5, Table 7, and Table 9 respectively show below roughness evaluation results obtained by measuring painted plates 3 to 6 in a state where the surfaces of metal plates are painted with paint as the measurement targets 22 in a similar manner, changing the measuring width of the two-dimensional laser displacement meter 12 to 0.5 mm, 1 mm, 2 mm, 4 mm, 16 mm, and 32 mm, and thus correcting by reference surface data averaged in the width direction (Y-axis direction) of two-dimensional laser at each measuring width.

The maximum height of the roughness profile Rz with the measuring width of the painted plate 3 at 32 mm was 60.4 µm, and the mean width of the roughness profile elements RSm of elements was 1820 µm. The maximum height of the roughness profile Rz with the measuring width of the painted plate 4 at 32 mm was 146.3 µm, and the mean width of the roughness profile elements RSm of elements was 2200 µm. The maximum height of the roughness profile Rz with the measuring width of the painted plate 5 at 32 mm was 76.5 µm, and the mean width of the roughness profile elements RSm of elements was 4150 µm. The maximum height of the roughness profile Rz with the measuring width of the painted plate 6 at 32 mm was 112.3 µm, and the mean width of the roughness profile elements RSm of elements was 5001 µm.

Table 4 shows the ratio of each measuring width in Table 3 to RSm (3325 µm) at a measuring width of 32 mm, and the percentage of each surface roughness parameter at each measuring width in Table 3 to each surface roughness parameter at a measuring width of 32 mm. Similarly, Table 6 shows those in Table 5, Table 8 shows those in Table 7, and Table 10 shows those in Table 9.

TABLE 3

| Measuring width (mm) | Rz (μm) | RSm (μm) | Rzjis (μm) | Ra (μm) | Rq (μm) | Rc (μm) | Rsk | Rku |
|---|---|---|---|---|---|---|---|---|
| 0.5 | 38.9 | 1871 | 27.0 | 5.1 | 6.7 | 15.0 | 0.0 | 4.0 |
| 1 | 50.5 | 1880 | 34.7 | 6.7 | 8.7 | 19.4 | 0.2 | 4.0 |
| 2 | 57.1 | 1902 | 38.6 | 7.4 | 9.7 | 21.5 | 0.2 | 4.2 |
| 4 | 60.7 | 1904 | 40.7 | 7.8 | 10.2 | 22.5 | 0.3 | 4.4 |
| 8 | 62.7 | 1915 | 41.7 | 8.0 | 10.5 | 23.3 | 0.4 | 4.5 |
| 16 | 63.7 | 1918 | 42.4 | 8.1 | 10.7 | 23.4 | 0.4 | 4.5 |
| 32 | 60.4 | 1820 | 40.2 | 7.8 | 10.2 | 22.2 | 0.4 | 4.2 |

TABLE 4

| Ratio of measuring width to RSm at measuring width of 32 mm | Percentage (%) of each surface roughness parameter at each measuring width to each surface roughness parameter value at measuring width of 32 mm | | | | | |
|---|---|---|---|---|---|---|
| | Rz (%) | RSm (%) | Rzjis (%) | Ra (%) | Rq (%) | Rc (%) |
| 0.3 | 64.5 | 102.8 | 67.2 | 66.2 | 65.6 | 67.6 |
| 0.5 | 83.6 | 103.3 | 86.4 | 86.2 | 85.1 | 87.3 |
| 1.1 | 94.6 | 104.5 | 96.0 | 95.3 | 94.7 | 96.8 |
| 2.2 | 100.5 | 104.6 | 101.1 | 100.5 | 100.3 | 101.3 |
| 4.4 | 103.9 | 105.2 | 103.7 | 103.5 | 103.4 | 104.7 |
| 8.8 | 105.5 | 105.4 | 105.4 | 105.0 | 105.0 | 105.3 |
| 17.6 | 100.0 | 100.0 | 100.0 | 100.0 | 100.0 | 100.0 |

TABLE 5

| Measuring width (mm) | Rz (μm) | RSm (μm) | Rzjis (μm) | Ra (μm) | Rq (μm) | Rc (μm) | Rsk | Rku |
|---|---|---|---|---|---|---|---|---|
| 0.5 | 72.5 | 2352 | 52.1 | 11.0 | 13.9 | 32.5 | 0.0 | 3.2 |
| 1 | 109.6 | 2343 | 79.0 | 16.9 | 21.3 | 48.4 | 0.0 | 3.1 |
| 2 | 131.0 | 2335 | 94.9 | 20.4 | 25.7 | 58.8 | 0.1 | 3.1 |
| 4 | 144.8 | 2334 | 104.3 | 22.7 | 28.5 | 65.3 | 0.2 | 3.1 |
| 8 | 150.1 | 2372 | 109.6 | 24.0 | 30.1 | 30.1 | 0.3 | 3.1 |
| 16 | 154.4 | 2341 | 112.3 | 24.6 | 31.0 | 69.9 | 0.4 | 3.2 |
| 32 | 146.3 | 2200 | 107.2 | 23.4 | 29.5 | 66.5 | 0.4 | 3.0 |

TABLE 6

| Ratio of measuring width to RSm at measuring width of 32 mm | Percentage (%) of each surface roughness parameter at each measuring width to each surface roughness parameter value at measuring width of 32 mm | | | | | |
|---|---|---|---|---|---|---|
| | Rz (%) | RSm (%) | Rzjis (%) | Ra (%) | Rq (%) | Rc (%) |
| 0.2 | 49.6 | 106.9 | 48.6 | 47.2 | 47.3 | 48.9 |
| 0.5 | 74.9 | 106.5 | 73.7 | 72.2 | 72.3 | 72.8 |
| 0.9 | 89.5 | 106.2 | 88.5 | 87.2 | 87.2 | 88.5 |
| 1.8 | 99.0 | 106.1 | 97.3 | 96.9 | 96.7 | 98.2 |
| 3.6 | 102.6 | 107.8 | 102.2 | 102.4 | 102.0 | 104.1 |
| 7.3 | 105.6 | 106.4 | 104.8 | 105.2 | 105.0 | 105.1 |
| 14.5 | 100.0 | 100.0 | 100.0 | 100.0 | 100.0 | 100.0 |

TABLE 7

| Measuring width (mm) | Rz (μm) | RSm (μm) | Rzjis (μm) | Ra (μm) | Rq (μm) | Rc (μm) | Rsk | Rku |
|---|---|---|---|---|---|---|---|---|
| 0.5 | 25.3 | 2676 | 17.5 | 3.9 | 5.0 | 10.8 | 0.0 | 3.1 |
| 1.0 | 41.2 | 3056 | 28.0 | 6.8 | 8.5 | 18.7 | 0.0 | 2.9 |

TABLE 7-continued

| Measuring width (mm) | Rz (μm) | RSm (μm) | Rzjis (μm) | Ra (μm) | Rq (μm) | Rc (μm) | Rsk | Rku |
|---|---|---|---|---|---|---|---|---|
| 2.0 | 57.8 | 3563 | 38.3 | 9.7 | 12.2 | 27.0 | −0.1 | 2.9 |
| 4.0 | 71.2 | 3955 | 46.0 | 12.2 | 15.3 | 34.4 | 0.0 | 2.8 |
| 8.0 | 77.7 | 4147 | 49.2 | 13.4 | 16.8 | 37.3 | 0.1 | 2.9 |
| 16.0 | 81.8 | 4267 | 51.7 | 14.3 | 17.8 | 39.8 | 0.2 | 2.8 |
| 32.0 | 76.5 | 4150 | 48.1 | 13.5 | 16.8 | 37.6 | 0.3 | 2.6 |

TABLE 8

| Ratio of measuring width to RSm at measuring width of 32 mm | Percentage (%) of each surface roughness parameter at each measuring width to each surface roughness parameter value at measuring width of 32 mm | | | | | |
|---|---|---|---|---|---|---|
| | Rz (%) | RSm (%) | Rzjis (%) | Ra (%) | Rq (%) | Rc (%) |
| 0.1 | 33.1 | 64.5 | 36.3 | 29.0 | 29.6 | 28.8 |
| 0.2 | 53.9 | 73.6 | 58.2 | 50.1 | 50.5 | 49.7 |
| 0.5 | 75.6 | 85.9 | 79.5 | 72.0 | 72.5 | 72.0 |
| 1.0 | 93.0 | 95.3 | 95.5 | 90.4 | 90.8 | 91.7 |
| 1.9 | 101.6 | 99.9 | 102.3 | 99.0 | 99.6 | 99.4 |
| 3.9 | 107.0 | 102.8 | 107.3 | 105.4 | 105.8 | 106.0 |
| 7.7 | 100.0 | 100.0 | 100.0 | 100.0 | 100.0 | 100.0 |

TABLE 9

| Measuring width (mm) | Rz (μm) | Rsm (μm) | Rzjis (μm) | Ra (μm) | Rq (μm) | Rc (μm) | Rsk | Rku |
|---|---|---|---|---|---|---|---|---|
| 0.5 | 21.6 | 3913 | 14.0 | 3.5 | 4.4 | 10.1 | 0.0 | 3.0 |
| 1.0 | 36.9 | 4140 | 23.6 | 6.3 | 7.8 | 18.3 | 0.0 | 2.9 |
| 2.0 | 64.3 | 4689 | 40.0 | 11.1 | 13.8 | 32.5 | 0.0 | 2.8 |
| 4.0 | 94.9 | 5257 | 55.9 | 16.4 | 20.4 | 48.3 | 0.1 | 3.0 |
| 8.0 | 104.7 | 5309 | 62.7 | 18.3 | 22.7 | 54.6 | 0.1 | 2.9 |
| 16.0 | 114.0 | 5365 | 69.7 | 19.9 | 24.8 | 59.8 | 0.2 | 2.9 |
| 32.0 | 112.3 | 5001 | 66.4 | 19.6 | 24.4 | 59.2 | 0.3 | 2.8 |

TABLE 10

| Ratio of measuring width to RSm at measuring width of 32 mm | Percentage (%) of each surface roughness parameter at each measuring width to each surface roughness parameter value at measuring width of 32 mm | | | | | |
|---|---|---|---|---|---|---|
| | Rz (%) | RSm (%) | Rzjis (%) | Ra (%) | Rq (%) | Rc (%) |
| 0.1 | 19.3 | 78.3 | 20.4 | 17.8 | 18.0 | 17.1 |
| 0.2 | 32.9 | 82.8 | 34.5 | 32.2 | 32.2 | 30.9 |
| 0.4 | 57.3 | 93.8 | 58.5 | 56.8 | 56.7 | 54.9 |
| 0.8 | 84.5 | 105.1 | 81.7 | 83.6 | 83.9 | 81.5 |
| 1.6 | 93.2 | 106.2 | 91.5 | 93.2 | 93.1 | 92.3 |
| 3.2 | 101.5 | 107.3 | 101.8 | 101.7 | 101.7 | 101.1 |
| 6.4 | 100.0 | 100.0 | 100.0 | 100.0 | 100.0 | 100.0 |

The roughness evaluation results in all of the painted plates 3 to 6 apparently tend to converge into 100% as the ratio of the measuring width to RSm becomes greater, and particularly, apparently converge into substantially 100% when the measuring width is approximately twice RSm.

FIG. 14 is a graph showing the relation between the ratio of a measuring width to mean width of the roughness profile elements RSm of elements at a measuring width of 32 mm, and the percentage (%) of the maximum height of the roughness profile Rz at each measuring width to the maximum height of the roughness profile Rz at a measuring width of 32 mm, regarding painted plates 2 to 6

As shown in FIG. 14, it has become apparent that, in all of the painted plates 2 to 6, the percentage of Rz converges into 100% and does not vary to a great extent when the measuring width is approximately two or more times RSm.

Thus, it has become apparent that, if the measuring width of the two-dimensional laser displacement meter 12 is at least two or more times the mean width of the roughness profile elements RSm of the elements of the measurement target 22, the possibility that a surface roughness shape is included in the reference surface data averaged in the width direction (Y-axis direction) of the two-dimensional laser decreases, and precision can be ensured.

It should be noted that, when surface roughness parameters of the measurement target 22 having unknown roughness are measured by use of the three-dimensional surface roughness evaluating device 10 according to the present invention, previously evaluating the mean width of the roughness profile elements RSm of the elements of the measurement target 22 by use of, for example, the method according to the conventional technique as described above is also effective.

Furthermore, when the mean width of the roughness profile elements RSm of the elements of the measurement target 22 cannot be previously evaluated, it is possible to perform a high-precision surface roughness evaluation by changing the measuring width of the two-dimensional laser displacement meter 12, and then setting a range having no great variation in each surface roughness parameter as a valid measurement width range, as stated above.

EXAMPLE 3

The three-dimensional surface roughness of a ship hull was measured as the measurement target 22 by use of the three-dimensional surface roughness data acquiring device 30 and the calculating device 18 which is an external terminal. It should be noted that the configuration of the three-dimensional surface roughness data acquiring device 30 according to Example 3 is similar to that of the three-dimensional surface roughness evaluating device 10 according to Example 1 from which the calculating device 18 is omitted.

FIG. 15(*a*) is a three-dimensional histogram showing the distribution of Rz (maximum height of the roughness profile) and RSm (mean width of the roughness profile elements) which are surface roughness parameters of a ship hull measured by use of the three-dimensional surface roughness data acquiring device 30. FIG. 15(*b*) is a histogram showing the distribution of the RSm component in FIG. 15(*a*). FIG. 15(*c*) is a histogram showing the distribution of the Rz component in FIG. 15(*a*).

After the completion of the painting of the ship hull, the process of scanning 27 cm in the X-axis direction by use of the three-dimensional surface roughness data acquiring device 30, and acquiring 9 pieces of data of 30 mm×30 mm was repeated. Measurements at 100 places were performed in the whole ship, and thus 900 pieces of data were acquired.

It should be noted that the measurements at 100 places were completed in approximately 2 hours. Among 900 measurement points, there were 620 pieces of valid data, excluding measurement errors and the like. As a result of calculating processing on the basis of the acquired data in the calculating device 18 which was an external terminal on the basis of the acquired data, Rz (maximum height of the roughness profile) which was a surface roughness parameter was 50.7 µm, and RSm (mean width of the roughness profile elements) was 3187 µm.

Moreover, the Rz distribution in the three-dimensional histogram shown in FIG. 15 was 20 µm to 140 µm, and the RSm distribution was 1750 µm to 7500 µm.

REFERENCE SIGNS LIST

10 Three-dimensional surface roughness evaluating device
12 Two-dimensional laser displacement meter
14 Movement mechanism
16 Movement distance measuring device
18 Calculating device
20 Transportable battery
22 Measurement target
30 Three-dimensional surface roughness data acquiring device
32 Storage device
34 Communication means

The invention claimed is:

1. A three-dimensional surface roughness evaluating device comprising:
    a three-dimensional surface roughness data acquiring device, comprising:
        a two-dimensional laser displacement meter;
        a movement mechanism which moves the two-dimensional laser displacement meter in an X-axis direction; and
        a movement distance measuring device which measures a movement distance of the two-dimensional laser displacement meter in the X-axis direction,
    wherein:
        the two-dimensional laser displacement meter is disposed so that a width direction of the two-dimensional laser displacement meter coincides with a Y-axis direction, to be able to measure displacement data of coordinates in the Y-axis direction at fixed intervals,
        the movement mechanism comprises two pairs of wheels or a crawler movable in a predetermined direction,
        the movement distance measuring device is a device that reads a movement distance with a scale sensor by a circular scale that operates together with the movement mechanism, and
        a measuring width of the two-dimensional laser displacement meter is at least two times a mean width of roughness profile elements (RSm) of elements of a measurement target; and
    a computer which generates three-dimensional surface roughness data of the measurement target on the basis of the displacement data acquired by the two-dimensional laser displacement meter and the movement distance data acquired by the movement distance measuring device,
    wherein the computer is configured to:
        generate reference surface data of each coordinate by averaging in the Y-axis direction the displacement data acquired at fixed intervals in the X-axis direction by the two-dimensional laser displacement meter, and
        generate three-dimensional surface roughness data of the measurement target by subtracting the reference surface data of each coordinate from the displacement data of each X-Y plane coordinate.

2. The three-dimensional surface roughness evaluating device according to claim 1, further comprising:
a transportable battery.

3. A three-dimensional surface roughness evaluating method of generating three-dimensional surface roughness data of a measurement target, the method comprising:
acquiring displacement data by measuring a displacement in an X-axis direction at fixed intervals by a two-dimensional laser displacement meter having a measuring width that is at least two or more times a mean width of roughness profile elements (RSm) of elements of a measurement target;
averaging the displacement data in the Y-axis direction and thus generating reference surface data of each coordinate; and
subtracting the reference surface data of each coordinate from the displacement data of each X-Y plane coordinate, and thus generating three-dimensional surface roughness data of the measurement target.

* * * * *